United States Patent [19]

Currie

[11] Patent Number: 5,602,948
[45] Date of Patent: Feb. 11, 1997

[54] FIBER OPTIC ILLUMINATION DEVICE

[76] Inventor: Joseph E. Currie, 17 Lawrence Rd., Hudson, N.H. 03051

[21] Appl. No.: 629,443

[22] Filed: Apr. 9, 1996

[51] Int. Cl.$^6$ ............................... G02B 6/32; F21V 7/04
[52] U.S. Cl. ................. 585/33; 385/53; 385/76; 385/77; 385/88; 385/89; 385/115; 385/147; 385/901; 362/32
[58] Field of Search ................. 385/31, 32, 33, 385/35, 53, 76, 77, 88, 89, 92, 93, 115, 119, 147, 901, 100; 362/32

[56] References Cited

U.S. PATENT DOCUMENTS

| | | | |
|---|---|---|---|
| 4,597,030 | 6/1986 | Brody et al. | 362/32 |
| 4,811,172 | 3/1989 | Davenport et al. | 362/32 X |
| 4,822,123 | 4/1989 | Mori | 385/33 X |
| 4,826,273 | 5/1989 | Tinder et al. | 385/901 X |
| 4,868,718 | 9/1989 | Davenport et al. | 362/32 |
| 4,889,085 | 6/1983 | Mori | 385/33 X |
| 5,000,535 | 3/1991 | Churchill | 385/901 X |
| 5,010,319 | 4/1991 | Killinger | 340/472 |
| 5,042,894 | 8/1991 | Swemer | 385/33 |
| 5,163,752 | 11/1992 | Copeland et al. | 362/32 X |
| 5,257,168 | 10/1993 | Davenport et al. | 362/32 |
| 5,274,215 | 12/1993 | Jackson | 219/439 |
| 5,278,731 | 1/1994 | Davenport et al. | 362/32 |
| 5,309,330 | 5/1994 | Pillers et al. | 362/32 |
| 5,369,721 | 11/1994 | Conti | 385/115 |
| 5,400,425 | 3/1995 | Nicholas et al. | 385/901 X |
| 5,422,792 | 6/1995 | Neumann | 362/32 |
| 5,430,621 | 7/1995 | Raskas | 362/32 |
| 5,436,806 | 7/1995 | Kato | 362/32 |
| 5,454,056 | 9/1995 | Brothers | 362/32 X |
| 5,475,574 | 12/1995 | Chien | 362/108 |
| 5,499,166 | 3/1996 | Kato et al. | 362/32 |

*Primary Examiner*—Brian Healy
*Attorney, Agent, or Firm*—Richard C. Litman

[57] ABSTRACT

A fiber optic illumination device provides both emergency warning lighting and supplemental lighting for work in conditions of darkness. The device includes a fiber optic cable which transmits light radially from the cable, thus providing high visibility for the cable when it is extended from a light source, and which also transmits light axially from the light output end of the cable, to provide a work light. The light source may comprise an incandescent bulb, high intensity light emitting diode, or other type of lighting, as desired, and may include a monochromatic filter to input colored light as desired to the cable. Electrical power for the light source may be provided from temporary or permanent connection to an automobile electrical system, or other source, as desired. Alternatively, the input end of the fiber optic cable may be detached from the light source, and secured to another light source, e.g., automobile headlight, for work on the vehicle. The output end of the cable may include an adjustable sheath thereon, which may be bent or flexed to hold a position as desired, and the output end of the cable may include a lens therein to focus the emitted light as desired.

20 Claims, 3 Drawing Sheets

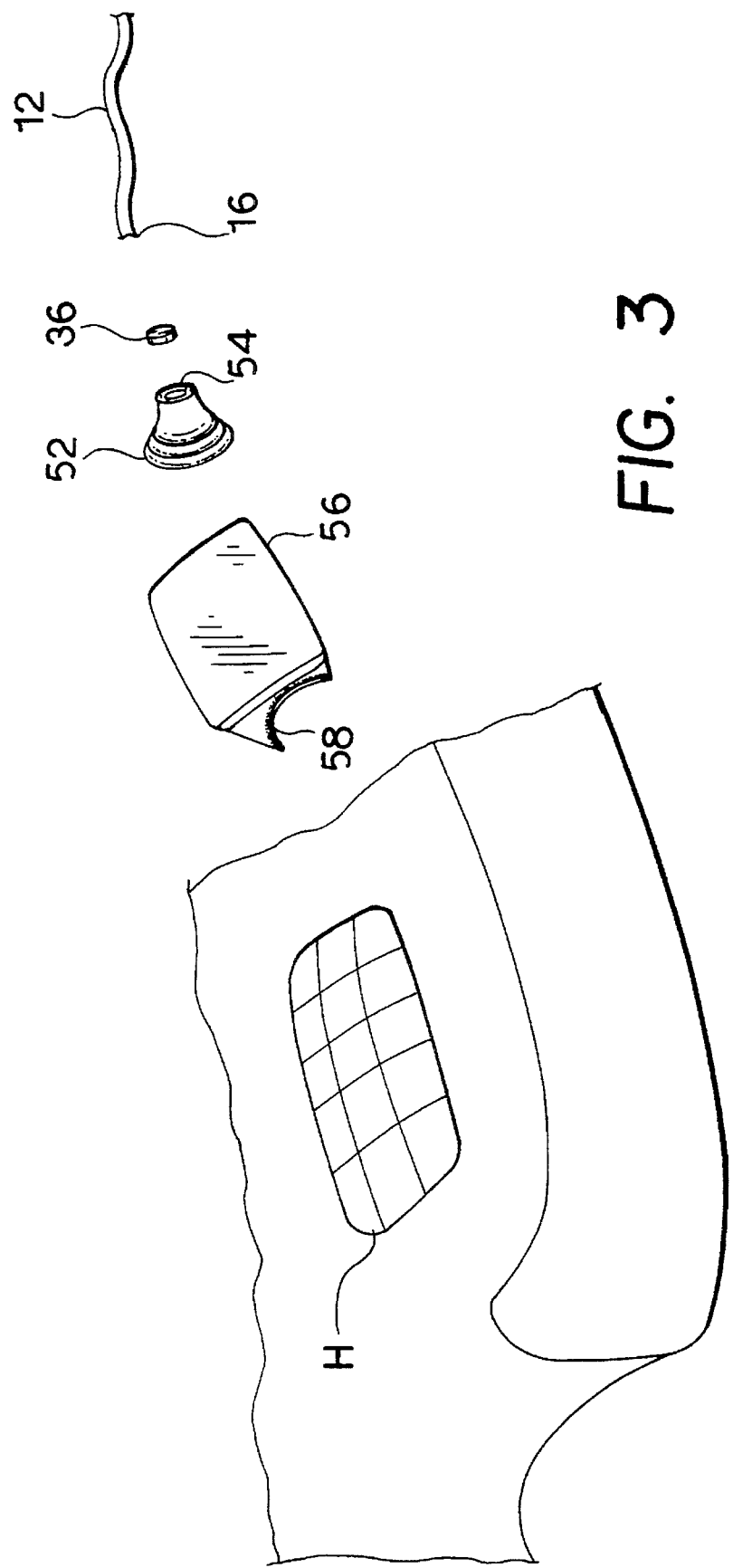

FIBER OPTIC ILLUMINATION DEVICE

BACKGROUND OF THE INVENTION

1. Field of the Invention

The present invention relates generally to lighting and illumination devices, and more specifically to such a device using a fiber optic cable which provides at least some lateral illumination from the sides of the cable. The cable is bare, i.e., has no protective sheath, or at least any such sheath is transparent or translucent in order to provide good light transmission properties. The present illumination device is well adapted for use as a supplemental or emergency light for automotive use, where light transmitted from the end of the cable can illuminate a work area, and light transmitted from the side can serve as a signal to warn others of the disabled or parked vehicle. A self contained light may be incorporated, or the device may utilize other vehicle lighting, as desired.

2. Description of the Prior Art

Some time after the advent of the automobile and its associated lighting systems for night travel, the emergency light was developed. Since that time, numerous different types of electrical, chemiluminescent, and combustive (flares, etc.) lights have been developed, to assist and protect the motorist during a roadside repair or emergency.

These devices generally serve one or the other of two purposes: (1) to provide supplemental illumination for repairs or other work which must be accomplished in order to proceed, or (2) to provide an illuminated emergency signal to others in the area. Very few, if any, devices have been developed which are intended to provide, and which are capable of providing, both supplemental lighting for work in conditions of poor lighting, and emergency warning lighting in such a situation, as is accomplished by the present invention. A discussion of the specific distinctions between the prior art which is known to the inventor, and the present invention, follows immediately below:

U.S. Pat. No. 5,163,752 issued to Debra L. Copeland et al. on Nov. 17, 1992 describes a Flashlight Holder Apparatus wherein a flexible tube is secured to "C" clamp at one end, and to a flashlight holder at the opposite end. This tube does not pass light, but a supplementary fiber optic cable is provided which may be secured to the end of the flashlight, to provide "pinpoint" light emission, i.e., within a wall cavity, etc. However, no disclosure is made of any radial light emission from any portion of the cable, which would appear to be desirable in view of the need to illuminate the interior of a wall cavity or the like. Yet, Copeland et al. clearly do not anticipate such a need or function for their apparatus, as FIGS. 9 and 10 clearly show light emitting only from the end of the fiber optic cable, and the term "pinpoint illumination" (col. 4, line 3) does not describe illumination from other than the relatively small end of the cable.

U.S. Pat. No. 5,257,168 issued to John M. Davenport et al. on Oct. 26, 1993 describes a Projection Headlamp Lighting System Using A Light Conductor Having Stepped Termination. The apparatus comprises a central light source and a fiber optic cable transmitting the light to a projecting lens. The device is adaptable for vehicle lighting, i.e., headlights, by means of the stepped end of the cable, which provides different focal lengths for the light transmitted from the cable and thus provides a spread of light from a concentrated central area to the outlying edge of the projected light pattern. No mention is made of radial or lateral emission of light from the sides of the cable, as such would diminish the light transmitted through the cable to the lens.

U.S. Pat. No. 5,274,215 issued to Emily R. Jackson on Dec. 28, 1993 describes a Portable Electric Food Warming Apparatus Having A Removable Tray Insert. The lower portion of the tray includes a periphery having a fiber optic cable imbedded in a channel therein, to illuminate the contents of the tray. The fiber optic cable emits light laterally, but is an inflexible, rigid installation, confined within a channel within the periphery of the tray. The Jackson device would not be suitable for use in the environment of the present invention, as (1) light is emitted laterally in only one direction, with light from other directions being blocked by the channel in which the cable is seated; (2) no light is emitted from the end of the cable, as in the present invention; and (3) the cable cannot flex to be positioned as desired, as in the present invention.

U.S. Pat. No. 5,278,731 issued to John M. Davenport et al. on Jan. 11, 1994 describes a Fiber Optic Lighting System Using Conventional Headlamp Structures, which system is somewhat related to the '168 patent to the same inventors and discussed above. Again, a central lighting source is used to provide light to a fiber optic cable, which transmits the light to a projection means, in this case, a conventional headlight assembly less the incandescent bulb. As in the '168 patent discussed above, any lateral emission of light from the cable would be undesirable, as such lateral light emission would degrade the amount of light transmitted to the headlight assembly.

U.S. Pat. No. 5,309,330 issued to Russell B. Pillers et al. on May 3, 1994 describes a Light Box adapted for use in instruments used in internal medical examination. An external light source is provided, with a flexible fiber optic cable extending therefrom which is inserted into the body of the patient. The Pillers et al. invention is directed to a means of mounting the cable to the light box, and does not disclose any lateral emission of light from the cable. In fact, the cable disclosed in the Pillers et al. patent includes a protective sheath therearound, and any lateral emission of light would reduce the amount of light transmitted to the cable end, as in many of the devices discussed above. Such reduction of axially transmitted light in a fiber optic cable, is generally not desirable in most applications, the present invention being one of the exceptions to that rule.

U.S. Pat. No. 5,422,792 issued to Rainer Neumann on Jun. 6, 1995 describes an Illumination Device For Vehicles, having a single light source which supplies a plurality of fiber optic cables to distribute the light to various sources. Each of the fiber optic cables includes a reflective mirror at its output end, which mirrors may be selectively positioned to allow light to pass from the cable through a lens for external illumination, or which may alternatively be positioned to reflect the light to another position, somewhat in the manner of the mirror arrangement in a single lens reflex camera. No disclosure is made of lateral emission of light from the sides of the cables, nor of any flexibility in the cables, which features would not be required in the automotive primary lighting system environment of the Neumann apparatus.

U.S. Pat. No. 5,430,621 issued to Eric J. Raskas on Jul. 4, 1995 describes an Illuminatible Shoelace Device, wherein two substantially equal lengths of flexible fiber optic material extend from a central lighting source, containing one or more LEDs. A single tubular woven covering is disposed over the fiber optic strands, to provide sufficient strength for the lace. The central lighting source is placed at the base of the lacing eyelets, and the fiber optic laces are laced conventionally thereacross. Raskas teaches away from the present invention, due to (1) the need for Raskas to install the lighting source medially between two sections of fiber optic cable, (2) the lack of axial illumination from the ends, and (3) the woven lace material over the fiber optic cable.

U.S. Pat. No. 5,436,806 issued to Hideyuki Kato on Jul. 25, 1995 describes an Illumination Device wherein means to reduce the loss of light transmission in bends in a fiber optic system, are disclosed. The Kato device is primarily directed to use as the primary lighting system for the vehicle (i.e., headlights) and as such, the transmission of light radially or laterally from the fiber optic light path is undesirable. In the present invention, lateral or radial losses through the sides of the cable, due to relatively sharp bends or other means, is desirable, in order to make the lateral surface of the cable more visible. Moreover, the Kato system is not physically flexible, as in the present invention, for positioning as required and for compact storage.

U.S. Pat. No. 5,454,056 issued to Harlan J. Brothers on Sep. 26, 1995 describes a Luminous Pull-Cord For Electrical Switch Operation, comprising suitable electrical power conversion means to illuminate an LED, which in turn illuminates a fiber optic cable or cord extending therefrom. Brothers describes his cord as allowing the light to radiate radially outward from the sides of the cord or cable, as in the present invention. However, several other differences are apparent: (1) Brothers specifically provides electrical circuitry allowing his device to be powered from 110 to 120 volt a. c. electrical power, and specifically teaches away from battery power as being too costly, whereas the present invention uses vehicle battery power, and (2) Brothers is silent regarding any axial light emission from the end of the cord, as provided by the present invention.

Finally, U.S. Pat. No. 5,475,574 issued to Tseng-Lu Chien on Dec. 12, 1995 describes a Shoulder Band With An EL Light Strip, which is removably attachable to a handbag, suitcase, or the like. The shoulder band and EL (electroluminescent) strip are relatively broad and flat bands, and when the EL strip is secured to the shoulder strap or band, any light radiation is strictly in a single direction, rather than radiating omnidirectionally outwardly from the sides, as in the present fiber optic cable. Moreover, Chien requires relatively complex electronic circuitry, to modify the electrical current from the d. c. provided by his battery power source, to the a. c. required to operate the EL strip. The present invention makes use of d. c. electrical power either directly or indirectly from the vehicle electrical system, to provide power for a light used with the present invention. Further, the Chien EL strip is an electrically powered light emitting device, and cannot function without electrical power applied directly thereto, while the fiber optic cable used in the present invention is merely a transmitter, and utilizes light provided from another source; it should be noted that such light may be non-electric, as the fiber optic cable itself is not dependent upon electricity for operation.

None of the above inventions and patents, taken either singly or in combination, is seen to describe the instant invention as claimed.

SUMMARY OF THE INVENTION

Accordingly, it is a principal object of the invention to provide an improved fiber optic illumination device which includes a fiber optic cable adapted to radiate light laterally from the sides of the cable, as well as axially from the end of the cable.

It is another object of the invention to provide an improved fiber optic illumination device which light source may be integrated therewith at one end of the cable, or which may alternatively be provided from another source to which one end of the cable may be removably secured.

It is a further object of the invention to provide an improved fiber optic illumination device which integrated light source may include incandescent, high intensity light emitting diode, or other means as desired.

Yet another object of the present invention is to provide an improved fiber optic illumination device which light source integrated therewith may be temporarily or permanently connected to a vehicle electric system.

Still another object of the invention is to provide an improved fiber optic illumination device which may include a lens at the distal or output end of the cable, providing for the focus of light emitted therefrom, and a flexible sheath adjacent to the distal end, which sheath may be adjustably fixed to hold a position as desired.

An additional object of the invention is to provide an improved fiber optic illumination device which input end may communicate with a monochromatic filter, to provide a colored light as desired radiating from the cable.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is an exploded perspective view of an alternative embodiment, wherein the vehicle lighting system is used to provide the illumination means for the fiber optic cable.

Similar reference characters denote corresponding features consistently throughout the attached drawings.

DETAILED DESCRIPTION OF THE PREFERRED EMBODIMENTS

The present invention relates to a fiber optic illumination device, generally indicated by the numeral 10, which provides both emergency warning lighting and also lighting for working in conditions of low visibility or darkness. The present fiber optic device comprises two embodiments, the first of which is disclosed in FIGS. 1 and 2.

Figure 1:
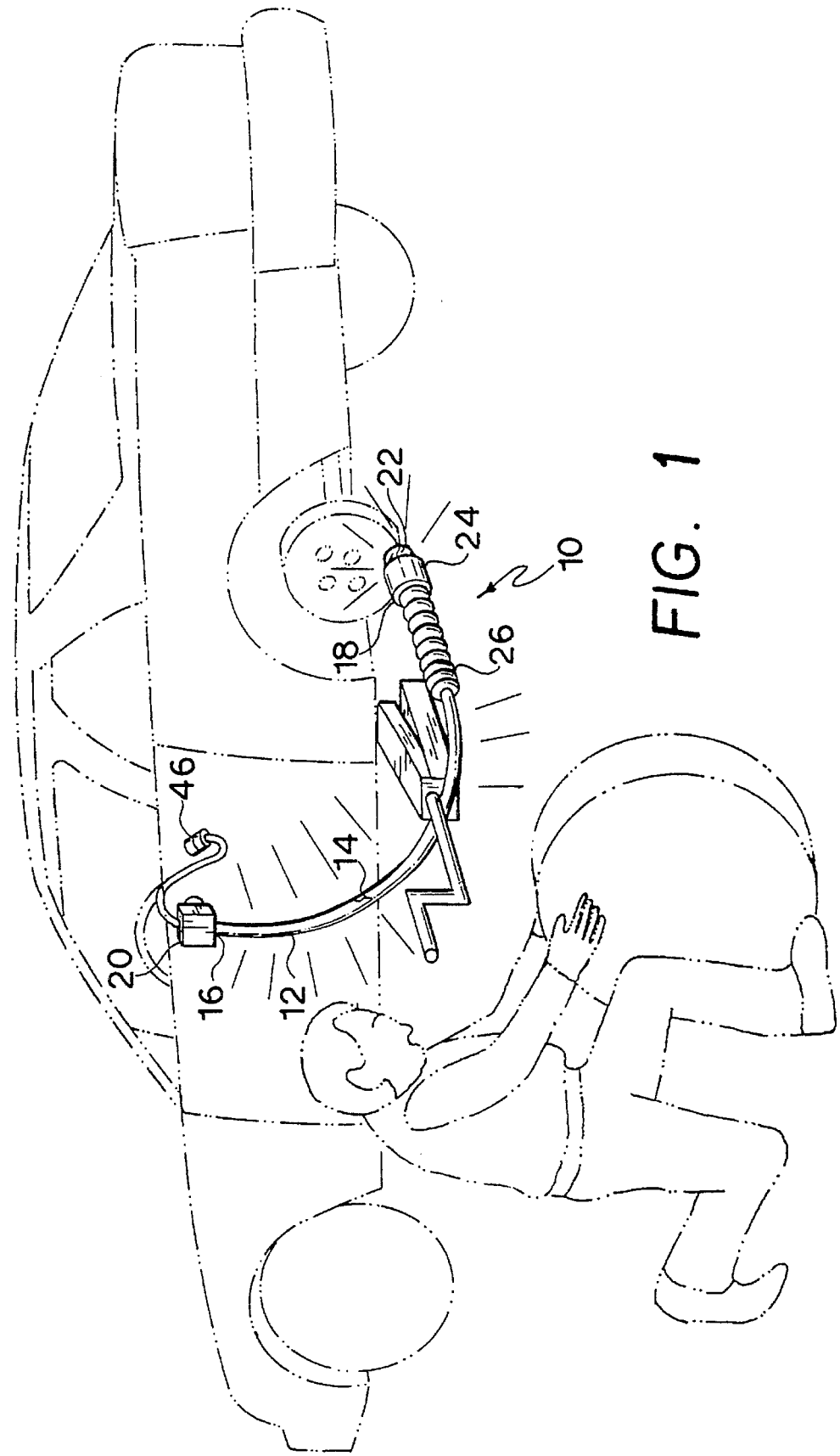
FIG. 1 is a perspective view of the present invention in use, showing generally its adaptation to a vehicle electrical system to provide electrical power therefor for the operation of electrical illumination means integrated therewith.

In FIG. 1, the fiber optic illumination device 10 is shown in use, and generally comprises a single length of flexible, elongate fiber optic cable 12 having a light emitting lateral surface 14, a light input end 16, and an opposite light output end 18. (It will be understood that the present cable 10 may comprise a plurality of relatively fine fiber optic strands bundled together, to provide the desired flexibility.) The light input end 16 communicates with a light source 20, which comprises a housing including one of various types of electrical lighting means therein, as desired. The light source 20 in turn receives electrical power from a source of electrical energy, e.g., the cigarette lighter adapter 46 shown in FIG. 1.

The opposite, light output end 18 of the cable 12 may include a lens 22, providing for the focus of light output from the cable. The lens 22 may have an adjustable focal length, by means of a threaded or telescoping collar 24, in order to adjust the spread and corresponding intensity of the light in the work area. A bendably adjustable sheath 26 may also be provided, to hold the output end 18 positionally as desired to illuminate the work.

Figure 2:
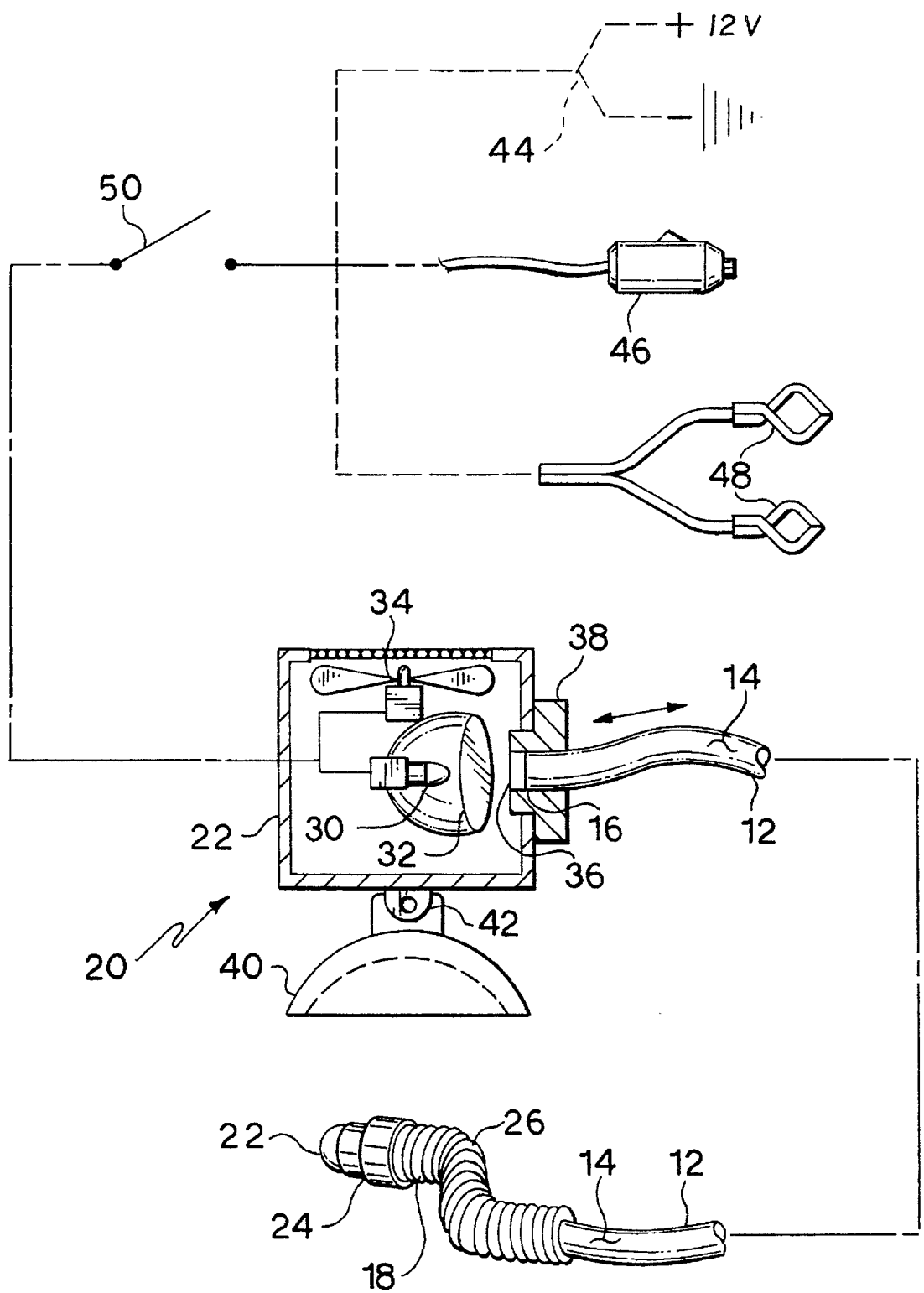
FIG. 2 is a pictorial schematic view of various alternative components which may generally comprise the embodiment of FIG. 1.

FIG. 2 provides further detail of the above generally described and illustrated features of FIG. 1. The light source 20 includes a housing 22, which contains lighting means 30 therein, such as an incandescent bulb, high intensity light emitting diode, or other suitable means of producing light. A lens 32 may be provided as required to focus the light at the light input end 16 of the cable 12, and a cooling fan 34 may also be provided for lighting means which produce large amounts of heat, i.e., projector lamps, etc.

A monochromatic filter 36 may also be provided, if desired, to color or tint the light which radiates from the fiber optic cable 12 when the light source is activated. An amber tint is preferred, as this would provide a readily visible warning light radiating omnidirectionally from the surface 14 of the cable 12, yet still provide a good working light emanating from the output end 18 of the cable 12. The filter 36 is preferably fixedly installed within a cable input end retainer 38, thus serving to position properly the input end 16 of the cable. (Alternative light tinting means may be used, as desired, e.g., a colored but translucent covering disposed over the surface 14 of the cable 12, to provide the desired color for the warning light radiating therefrom, while still providing a white work light emanating from the output end 18 of the cable 12. Another alternative would be to tint or color the lens 32 itself, thus obviating need for a separate filter 36.)

The light box or housing 22 may be secured to any convenient surface in a number of ways, e.g., the suction cup 40 shown in FIG. 2, etc. Other means (magnetic, etc.) may be used, but the suction cup 40 provides for attachment of the light housing 22 to plastic and glass surfaces, as well as steel body panels. Further convenience may be provided by securing the suction cup 40 or other attachment means to the light housing 22 by means of a swivel 42.

The electrical lighting means 30 may receive power from a self contained battery pack within the housing 22, but as the present invention is directed to use as an automotive accessory, various means may be adapted to use the electrical system or supply of the automobile. The system may be permanently wired into the electrical supply of the vehicle, as indicated by the alternative wiring system 44 of FIG. 2, or may be temporarily connected thereto by means of a cigarette lighter adaptor plug 46, or a pair of clips 48 for attachment to the vehicle battery terminals, as desired. A switch 50 may be provided (particularly in the case of the permanently wired installation 44), to operate the light 30 as selectively as desired.

While the light input end 16 of the cable 12 may be permanently installed within the light housing receptacle or retainer 38, the retainer 38 may include a socket which is adapted to grip the input end 16 of the cable 12 firmly, but still allow the cable input end 16 to be removed as desired, as indicated by the arrow, in the event some alternative lighting means is desired, as in the event of the light 30 burning out within the housing 22.

FIG. 3 illustrates such an alternative lighting means, wherein the light input end 16 of the cable 12 is adapted to receive light projected from another source, e.g., automobile headlight H. A suction cup 52 includes a socket 54, into which the light input end 16 of the cable 12 may be permanently or removably installed. As in the case of the light source 20 discussed above, a filter 36 may be temporarily or permanently installed within the suction cup socket 54, in order to provide colored light as desired. The suction cup 52 may be formed of a soft, compliant and transparent plastic material for good light transmission properties, or alternatively a light transmitting passage may be provided from the cup to the socket 54, so long as a good vacuum seal may still be obtained for the cup 52.

In many cases, headlights include various projections on the outer surface of the lens, e.g., alignment points, Fresnel lens divisions, etc. As a result, it may be difficult to seat a suction cup upon such an irregular surface. Accordingly, the present invention may include a suction cup support sheet 56, formed of a soft, transparent plastic material with an adhesive surface and liner 58 removably disposed thereover. Such sheets 56 (as well as suction cups adaptable for use with the present invention) are made by Suction Cups, Inc., of Green Point, N.Y. The liner 58 is peeled from the adhesive coating of the support sheet 56, and the sheet 56 is adhesively secured to the surface of the headlight H, and left for future use as desired. The suction cup 52 may then be securely but removably attached to the support sheet 56, as desired.

In summary, the above described fiber optic illumination device 10 will be seen to provide a most useful accessory for the owner and/or user of an automobile or other motor vehicle. In the event of problems at night or conditions of poor visibility, the present illumination device 10 may be deployed by connecting and activating the light source 20 as required (or securing the light input end 16 of the cable to an appropriate lighting source, e.g., headlight H, as described above), and extending the flexible fiber optic cable 12 as desired, to position the output end 18 as desired to illuminate the work area. The remainder of the cable 12 will be extended from the light source (light housing 28 or headlight H), and with the light radiating omnidirectionally therefrom, will appear as a thin glowing amber or other colored line, depending upon the filter 36 used. Such an appearance helps to delineate the limits of a disabled automobile, over and above other automobile lighting which may be in operation.

The light output end 18 of the cable 12 may be positioned as desired by bending the bendably adjustable and flexible sheath 26 as desired, e.g., as shown in FIG. 2. The work light from the output end 18 of the cable 12 may be focused as desired with the lens adjustment 24, to provide a relatively broad flood of light, as to illuminate a wheel during a tire change, or the light may be narrowed to provide a more intense light for finer work, e.g., an adjustment under the hood.

When the problem has been resolved, the light source 20 may be disconnected (or the switch 50 opened, in the event of a permanently wired installation), or the suction cup 52 removed from the headlight H (or suction cup support sheet 56 disposed thereover), with the cable 12 and associated wiring being coiled for storage for later use.

It will be seen that the present invention extends itself to use in other than the automotive emergency repair environment, and will prove to be a handy accessory in many different fields, including the maritime and aviation environments. The light may also provide a decorative, "just for fun" appearance for a vehicle at night, and may prove useful in finding one's vehicle in a large and crowded parking area or the like, if deployed for such use. Further uses for the present fiber optic illumination device may be envisioned by users thereof, and are practically unlimited.

It is to be understood that the present invention is not limited to the sole embodiments described above, but encompasses any and all embodiments within the scope of the following claims.

I claim:

1. A fiber optic illumination device, comprising:

a single length of flexible and elongate fiber optic cable having a lateral surface, a light input end, and an opposite light output end, and further being adapted to emit light radially from said lateral surface thereof as well as axially from said light output end thereof, and;

said light input end of said cable being adapted for selectively removable attachment to a light source and said cable being adapted to provide both emergency warning light radiating omnidirectionally from said lateral surface and work light emanating axially from said light output end when said cable is connected to a light source.

2. The fiber optic illumination device of claim 1, including:

a positionally adjustable sheath disposed about said cable adjacent said light output end and extending a short distance along said length of said cable, with said sheath being bendably adjustable as desired and adapted to hold a position as adjusted.

3. The fiber optic illumination device of claim 1, including:

an adjustably and selectively focusable lens disposed at said light output end of said cable, said lens providing for the selectively adjustable focus of the spread and intensity of light emitted from said output end.

4. The fiber optic illumination device according to claim 1, including:

a monochromatic filter selectively disposed at said light input end of said cable, with said filter adapted to transmit monochromatic light to said cable with said cable thereby emitting monochromatic light as determined by said filter.

5. The fiber optic illumination device according to claim 1, including:

lighting means selectively communicating with said input end of said cable, with said lighting means being selected from the group consisting of at least one high intensity light emitting diode, and at least one incandescent lamp.

6. The fiber optic illumination device according to claim 5, wherein:

said lighting means includes electrical connection means to a vehicle electrical system selected from the group consisting of temporary electrical connection means, and permanent electrical connection means.

7. The fiber optic illumination device according to claim 1, including:

attachment means providing for the selectively removable and temporary attachment of said input end of said cable to a separate light source.

8. The fiber optic illumination device according to claim 7, wherein:

said attachment means comprises a suction cup which is removably securable to the separate light source, and with said input end of said cable being removably securable to said suction cup.

9. A fiber optic illumination device, comprising:

a single length of flexible and elongate fiber optic cable having a lateral surface, a light input end, and an opposite light output end, and further being adapted to emit light radially from said lateral surface thereof as well as axially from said light output end thereof, and;

a light source, comprising at least a housing having electrically powered lighting means therein and electrical connection means to a source of electrical power, with said lighting means communicating with said light input end of said cable and said light input end of said cable being adapted for selectively removable attachment to said light source and said cable being adapted to provide both emergency warning light radiating omnidirectionally from said lateral surface of said cable and to provide work light emanating from said light output end of said cable when said cable is connected to said light source.

10. The fiber optic illumination device according to claim 9, including:

a positionally adjustable sheath disposed about said cable adjacent said light output end and extending a short distance along said length of said cable, with said sheath being bendably adjustable as desired and adapted to hold a position as adjusted.

11. The fiber optic illumination device according to claim 9, including:

an adjustably and selectively focusable lens disposed at said light output end of said cable, said lens providing for the selectively adjustable focus of the spread and intensity of light emitted from said output end.

12. The fiber optic illumination device according to claim 9, including:

a monochromatic filter selectively disposed at said light input end of said cable, with said filter adapted to transmit monochromatic light to said cable with said cable thereby emitting monochromatic light as determined by said filter.

13. The fiber optic illumination device according to claim 9, wherein:

said lighting means is selected from the group consisting of at least one high intensity light emitting diode, and at least one incandescent lamp.

14. The fiber optic illumination device according to claim 9, wherein:

said lighting means includes electrical connection means to a vehicle electrical system selected from the group consisting of temporary electrical connection means, and permanent electrical connection means.

15. A fiber optic illumination device, comprising:

a single length of flexible and elongate fiber optic cable having a lateral surface, a light input end, and an opposite light output end, and further adapted to emit light radially from said lateral surface thereof as well as axially from said light output end thereof, and;

said light input end including attachment means providing for the selectively removable and temporary attachment of said input end to a separate light source, with said cable being adapted to provide both emergency warning light radiating omnidirectionally from said lateral surface of said cable and work light emanating axially from said light output end of said cable when said cable is temporarily and removably connected to the separate light source.

16. The fiber optic illumination device of claim 15, including:

a positionally adjustable sheath disposed about said cable adjacent said light output end and extending a short distance along said length of said cable, with said sheath being bendably adjustable as desired and adapted to hold a position as adjusted.

17. The fiber optic illumination device according to claim 15, including:

an adjustably and selectively focusable lens disposed at said light output end of said cable, said lens providing for the selectively adjustable focus of the spread and intensity of light emitted from said output end.

18. The fiber optic illumination device according to claim 15, including:

a monochromatic filter selectively disposed at said light input end of said cable, with said filter adapted to transmit monochromatic light to said cable with said cable thereby emitting monochromatic light as determined by said filter.

19. The fiber optic illumination device according to claim 15, wherein:

said attachment means comprises a suction cup which is removably securable to the separate light source, and with said output end of said cable being removably securable to said suction cup.

20. The fiber optic illumination device according to claim 15, including:

a suction cup support sheet adapted to be adhesively secured to the separate light source, and to provide proper sealing for said suction cup removably secured thereto.

* * * * *